United States Patent
Helfman et al.

(10) Patent No.: US 8,396,929 B2
(45) Date of Patent: Mar. 12, 2013

(54) METHOD AND APPARATUS FOR DISTRIBUTED APPLICATION CONTEXT AWARE TRANSACTION PROCESSING

(75) Inventors: Nadav Helfman, Binyamina (IL); Michael Groys, Tel-Aviv (IL); Alex Drobinsky, Ra'anana (IL)

(73) Assignee: SAP Portals Israel Ltd. (IL)

( * ) Notice: Subject to any disclaimer, the term of this patent is extended or adjusted under 35 U.S.C. 154(b) by 725 days.

(21) Appl. No.: 12/166,326

(22) Filed: Jul. 2, 2008

(65) Prior Publication Data

US 2010/0005478 A1 Jan. 7, 2010

(51) Int. Cl.
- G06F 15/16 (2006.01)
- G06F 15/177 (2006.01)
- G06F 17/00 (2006.01)
- G06F 17/30 (2006.01)

(52) U.S. Cl. ........ 709/206; 709/201; 709/203; 709/218; 709/220; 709/228; 707/693; 707/694; 707/736

(58) Field of Classification Search .................. 707/609, 707/622, 703, 756, 770, 794, 912, 693–694, 707/736; 709/203, 215–220, 201, 206, 227–228; 719/313–314, 318, 320
See application file for complete search history.

(56) References Cited

U.S. PATENT DOCUMENTS

| | | | |
|---|---|---|---|
| 6,421,673 B1* | 7/2002 | Caldwell et al. ........................ 1/1 |
| 6,434,624 B1* | 8/2002 | Gai et al. ........................ 709/232 |
| 6,928,480 B1* | 8/2005 | Gadagkar et al. ............. 709/227 |
| 7,180,899 B2* | 2/2007 | De Silva et al. ......... 370/395.31 |
| 7,398,533 B1* | 7/2008 | Slaughter et al. ............. 719/328 |
| 7,499,456 B2* | 3/2009 | De Silva et al. ......... 370/395.53 |
| 7,502,842 B2* | 3/2009 | Graham et al. ............... 709/223 |
| 7,673,325 B2* | 3/2010 | Vincent et al. .................... 726/3 |
| 8,098,586 B2* | 1/2012 | Schreiber ...................... 370/252 |
| 2002/0099858 A1* | 7/2002 | Lindo et al. ................... 709/250 |
| 2002/0184374 A1* | 12/2002 | Morikawa ..................... 709/229 |
| 2004/0081180 A1* | 4/2004 | De Silva et al. .............. 370/402 |
| 2004/0243841 A1* | 12/2004 | Stumpf et al. ................. 713/201 |
| 2005/0198121 A1* | 9/2005 | Daniels et al. ................ 709/203 |
| 2005/0198154 A1* | 9/2005 | Xie et al. ....................... 709/206 |
| 2006/0041751 A1* | 2/2006 | Rogers et al. ................. 713/171 |
| 2006/0129650 A1* | 6/2006 | Ho et al. ........................ 709/207 |
| 2006/0190231 A1* | 8/2006 | Malloy et al. ................... 703/14 |
| 2007/0191040 A1* | 8/2007 | Kadar et al. ................... 455/466 |
| 2008/0228901 A1* | 9/2008 | Choi et al. ..................... 709/220 |

FOREIGN PATENT DOCUMENTS

| | | | |
|---|---|---|---|
| EP | 1119139 | * | 7/2001 |
| EP | 1971163 | * | 9/2008 |
| EP | 1615390 | * | 10/2008 |

* cited by examiner

*Primary Examiner* — Srirama Channavajjala (57) ABSTRACT

A method and apparatus for applying a uniform processing policy within a distributed computer network. A message is received at a termination point from an application used by a user. At the termination point tagging information is attached to the message, the tagging information indicating which processes the message should undergo, and with which parameters or configurations. The message is then processed in the distributed network according to the tagging information so that uniform processing is assured. If required, a response message is generated, and is assigned substantially the same tagging information as the original message.

23 Claims, 7 Drawing Sheets

METHOD AND APPARATUS FOR DISTRIBUTED APPLICATION CONTEXT AWARE TRANSACTION PROCESSING

TECHNICAL FIELD

The present disclosure relates to distributed applications in general, and to a method and apparatus for implementing multi-node multi-function processing of application transactions, in particular.

BACKGROUND

Distributed environments typically provide users with access to multiple applications, and should aim at enabling overall optimal performance. A distributed environment typically comprises one or more servers, residing in one or more data centers, one or more (typically in the hundreds or thousands) users, and a communication channel, typically a distributed landscape, such as a wide area network (WAN). Provisioning an application service in a distributed computing environment often requires multiple processing actions, which may be supplied by different entities, such as software units on different computers in multiple physical locations. Each processing action may require its own set of definitions or configuration settings or values, which is derived from the context of the processed transaction and the entity handling the transaction. The distribution generates a number of problems. Operators or integrators of the environment have to translate their view of each available application into one or more configuration setting for each processing action associated with the application. Second, the task of classifying the actions repeats for every action associated with every transaction, thus consuming access resources.

The above problems are amplified by common middleware infrastructure used: on one hand, middleware infrastructure such as a single application server provides multiple application services under what is traditionally observed as a single network or web service. On the other hand, a single application service may be comprised of an integrated set of different network services or web services potentially using different protocols. This raises further questions, such as how to utilize the application context for each single processing action; how to define a single end-to-end scheme for a specific application context; and how to monitor the performance or behavior of different processing actions under the application context.

Thus there is a need in the art for a method and apparatus that will enable context-aware transaction processing in distributed environments, so that different processing associated with transactions stemming from various applications can be performed in a uniform and efficient method throughout the distributed system, according to a uniform policy.

SUMMARY

A method and apparatus for providing service in a distributed network, in a uniform cross-organization manner. The method and apparatus enable for lower TOC and does not require skilled personnel in remote locations for installation and maintenance of client devices.

In a preferred embodiment, there is thus provided in a distributed computer network, a method for providing a service according to a predetermined policy, the method comprising the steps of: receiving a tagging scheme related to an application; receiving a request message from the application; attaching tagging information to the request message according to the tagging scheme; sending the request message with the tagging information to one or more processors; retrieving one or more parameters or configuration values from the tagging information; and processing the request message according to the parameters or configuration values. The method can further comprise the step of providing a tagging scheme definition component for defining the tagging scheme. The method can further comprise the step of creating a response message having substantially the same tagging information as the request message. The method can further comprise the steps of: retrieving one or more second parameters or configuration values from the tagging information attached to the response message; and processing the response message according to the second parameters or configuration values. Within the method, the tagging scheme optionally relates to a transaction type to which the application belongs, or to a parameter or a configuration value of one or more items selected from the group consisting of: compression; decompression; encryption; decryption; tunneling; security; monitoring; routing; optimization; and quality of service. Within the method, the tagging scheme optionally relates to one or more items selected from the group consisting of: a service type; a sub-service type; the application; a transaction type associated with the application; a user of the application; a role of the user; a location of the user; a regional office used by the user; a data center associated with the user or with the application; and context of the application. Within the method, the predetermined policy is optionally an organization-wide policy.

Another aspect of the disclosure relates to an apparatus for providing a service in a distributed computer network according to a uniform policy, the apparatus comprising a first computing platform for receiving a request message from an application and executing a client front end, the client front end comprising: a termination point for receiving a request message from an application: a classification component for assigning tagging information to the request message according to the uniform policy; and an application layer processing engine for producing processing instructions associated with the request messages, based on the tagging information. The apparatus can further comprise a second computing platform for processing the request message, the second computing platform executing a server front end, the server front end comprising an application layer processing engine for producing processing instructions associated with the request message or the response message, based on the tagging information. Within the apparatus, the client front end can further comprise: a content caching and delivery services engine for caching and delivering the request message or the response message according to the tagging information of the request message; and a tunnel for transferring the request message or the response message with the tagging information within the distributed computer network. Within the apparatus the server front end can further comprise: a content caching and delivery services engine for caching and delivering the request message or a response message according to the tagging information of the request message; a tunnel for transferring the request message or the response message with the tagging information within the distributed computer network; a connection component for connecting the termination point and the second computing platform; and a classification component for assigning tagging information to a response message associated with the request message, according to uniform policy. Within the apparatus, the tunnel executed by the first computing platform comprises a compression component for compressing the request message or the response message according to the tagging information, or an optimization and prioritization component for optimizing and prioritizing message transferring. Within the apparatus, the tunnel executed by the second computing platform optionally comprises a compression component for compressing the request message or the response message according to the tagging information, or an optimization and prioritization component for optimizing and prioritizing message transferring. Within the apparatus, the tagging scheme optionally relates to a transaction type to which the application belongs. Within the apparatus, the tagging scheme optionally relates to a parameter or a configuration value of one or more items selected from the group consisting of: compression; decompression; encryption; decryption; tunneling; security; monitoring; routing; optimization; and quality of service. Within the apparatus, the tagging scheme optionally relates to one or more items selected from the group consisting of: a service type; a sub-service type; the application; a transaction type associated with the application; a user of the application; a role of the user; a location of the user; a regional office used by the user; a data center associated with the user or with the application; and context of the application. Within the apparatus, the connection component optionally comprises a load balancing component for balancing message transfer and processing operations between computing platforms within the distributed computer network, or an optimization and multiplexing component. The apparatus can further comprise a tagging scheme definition component for defining the uniform policy, or an administration agents component for extracting processing information from the tagging information. Within the apparatus the administration agents component optionally comprises a delivery policy agent for extracting delivery policy parameters, a monitoring agent for extracting monitoring parameters; or an alert agent for extracting alert-related parameters. Within the apparatus, the predetermined policy is optionally an organization-wide policy.

Yet another aspect of the disclosure relates to a computer readable storage medium containing a set of instructions for a general purpose computer, the set of instructions comprising: receiving a tagging scheme related to an application executed in a distributed computer network; receiving a request message from the application; attaching tagging information to the request message according to the tagging scheme, the tagging information in accordance with a predetermined policy within the distributed computer network; sending the request message with the tagging information to at lest one processor; retrieving one or more parameters or configuration values from the tagging information; and processing the request message according to the parameters or configuration values.

BRIEF DESCRIPTION OF THE DRAWINGS

Exemplary non-limited embodiments of the disclosed subject matter will be described, with reference to the following description of the embodiments, in conjunction with the figures. The figures are generally not shown to scale and any sizes are only meant to be exemplary and not necessarily limiting. Corresponding or like elements are designated by the same numerals or letters.

DETAILED DESCRIPTION

The disclosure relates to U.S. patent application Ser. No. 10/498,409 filed on Dec. 6, 2004 (published as US 2005/0091376), which is a national phase of International patent application number PCT/IL02/00991 filed on Dec. 9, 2002, assigned to the assignee of the disclosed application, and to U.S. patent application Ser. No. 11/389,890, filed on Mar. 27, 2006, which issued as U.S. Pat. No. 7,774,323 and is assigned to the assignee of the disclosed application, the full contents of both applications are incorporated herein by reference.

The disclosed method and apparatus provide for using a single organization-wide, preferably uniform policy for handling transactions executed in a distributed computing system. The method and apparatus use a system-wide indexing or tagging mechanism for the different aspects associated with application transaction messages. The same tagging is used in all messages associated with a transaction, thus providing for efficient and uniform handling and for distributed processing within the system.

The disclosed method and apparatus are typically used in a distributed landscape executing one or more applications. Typically, a distributed landscape is employed by an organization, wherein multiple users in diverse geographic locations are using the applications. The infrastructure comprises one or more data centers, each data center being a geographical location in which multiple computing platforms are located, taken care of by skilled personnel, and providing services to multiple distributed remote locations and users. The services are preferably consumed by remote appliances, such as personal computers or network computers, residing at or connected to regional offices. Each regional office is connected to one or more data centers, from which it receives services. The data centers and regional offices are preferably connected through a distributed landscape, employing for example a wide area network.

At a preliminary step, a tagging system is designed, so that each transaction type is assigned a processing sequence to be performed on messages associated with the transaction type, and each processing is associated with relevant parameters or configuration settings. Parameters generally relate to characteristics of the processing to be performed, while configuration generally relate to characteristics of a computing platform, a component, a software component, an installation, or the like. Each request processing is preferably performed by a processor, preferably a software unit such as an executable, a web service, or any other unit. The processors may manipulate the request sequence and may also generate a "response sequence" of response processors and configuration for each response processor.

Then, when an application is used, and a service request is made by a user, tagging is performed at a termination point, i.e. at the computing platform at which the user's request is first introduced to the system. The tagging is performed for each message associated with a transaction, i.e., tags are attached to each message. The tags relate to data which may include the service type, application, transaction type, sub-service-type, session, user's identity, user's location, user's role, regional office, data center, and other factors. The overall set of tags describes the context of the transaction. The tags may also include information relevant to all parts of the lifecycle of the transaction, including for example compression; decompression; encryption; decryption; tunneling; security; monitoring; routing; optimization manipulations; and quality of service.

This scheme allows configuration settings or selection of relevant processing steps with any required parameters. Each processing step may represent a sequence of processors in predetermined order and configuration parameters.

Then, when the message is handled, each processor handling the message extracts the relevant processing instructions and parameters associated with the tags of the message, and performs the processing accordingly, thus providing for uniform handling. The tags assigned to a request message are applicable and may also be used as default for generated response messages.

For example, in a particular transaction type, such as transactions associated with a particular application, if each message should undergo compression and caching, then once a message such as an HTTP message is assigned the relevant tags, these processing stages will be performed, using the relevant instructions and parameters as defined for this application type, such as the required compression scheme and correct parameters, and required caching scheme. The tags are optionally implemented as integers, so extracting the relevant processing instructions and parameters is performed efficiently. The databases storing the processing instructions and parameters, and the component for extracting the same are identical throughout the system, to ensure uniform processing. Optionally, at any particular processing point, only a subset of the tags may be used. For example, the user's identity is not relevant for choosing a compression method, but it is relevant when choosing Quality of Service (QoS).

Figure 1:
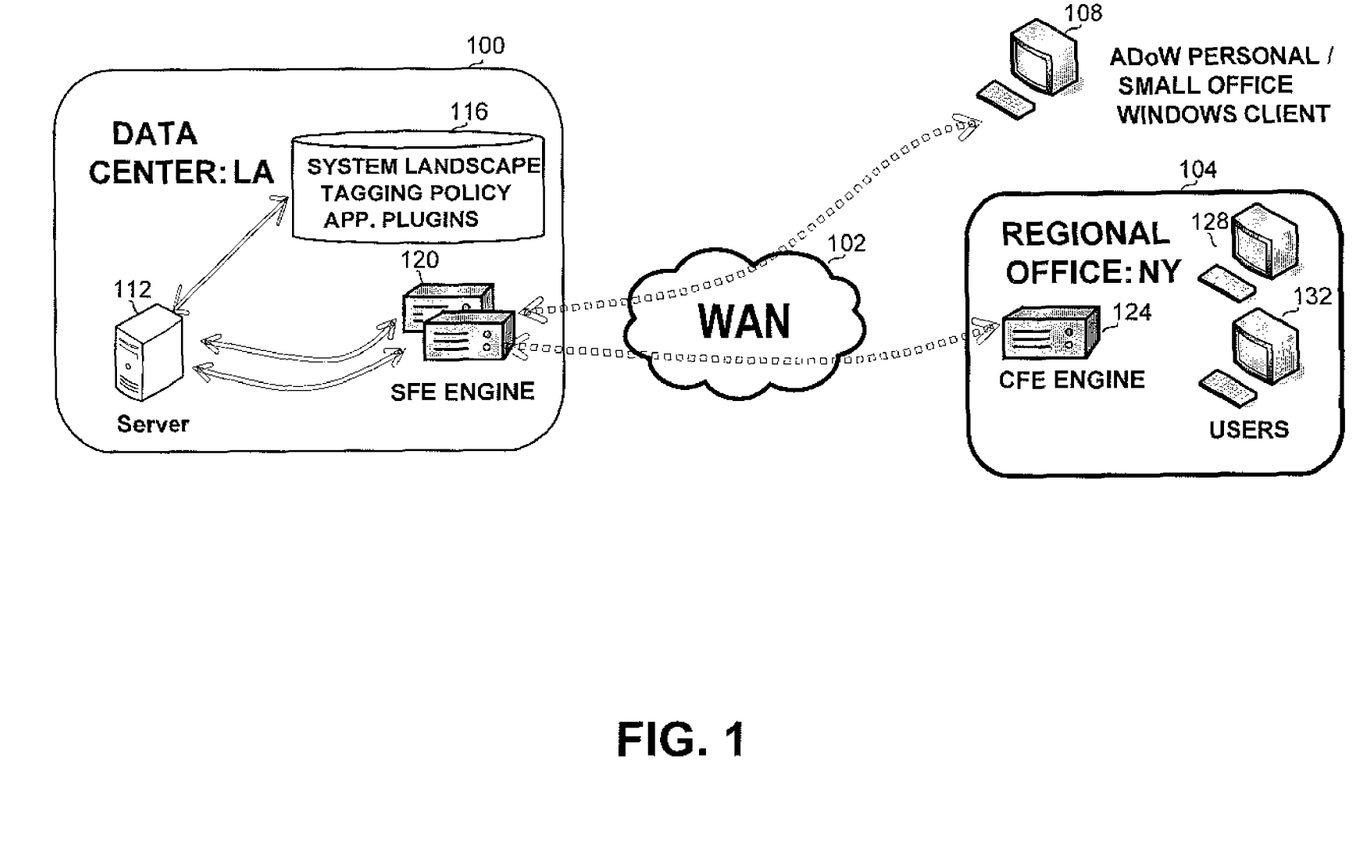
FIG. 1 is a schematic illustration of typical environment in which the disclosed apparatus is used.

Referring now to FIG. 1, showing a schematic illustration of a distributed landscape executing one or more applications, typically a distributed landscape employed by a large organization, wherein multiple users in diverse geographic locations are using the application. The infrastructure comprises one or more data centers such as data center (DC) 100. A data center is a geographical location in which multiple computing platform such as personal computers, mainframe computers or others are located, taken care of by skilled personnel, and providing services to multiple distributed remote locations and users. The services are preferably consumed from remote appliances, such as computing platform 108 used by a small office or a client. Additional consumers may be connected and consume the services via a regional office (RO), such as regional office 104. Each regional office is connected to one or more data centers, from which it receives services. The data centers and regional offices are preferably connected through a distributed landscape such as Wide Area Network (WAN) 102.

DC 100 typically comprises one or more severs such as server 112, a storage device such as device 116 for storing among other things also system tagging policy, from which the relevant processors and parameters are retrieved according to the tags of a particular message, and a server front end (SFE) engine 120, detailed in association with FIG. 3 below. Device 116 also stores delivery policy with tags, including service type tags which include configuration settings for the application plug-ins, as described in. U.S. patent application Ser. No. 11/389,890, which issued as U.S. Pat. No. 7,774,323, incorporated herein by reference.

RO 104 typically contains or is connected to one more user platforms such as 128, 132 which consume services from a client front end (CFE) 124, detailed in association with FIG. 2 below. It will be appreciated that A single CFE can serve multiple ROs.

SFE engine 120 and CFE engine 124 are preferably implemented as software components executed on one or more computing platforms, such as a mainframe, a desktop computer, a laptop computer or others, and implemented in any programming language, such as Java, C++, C# or others, or a combination thereof.

Figure 2:
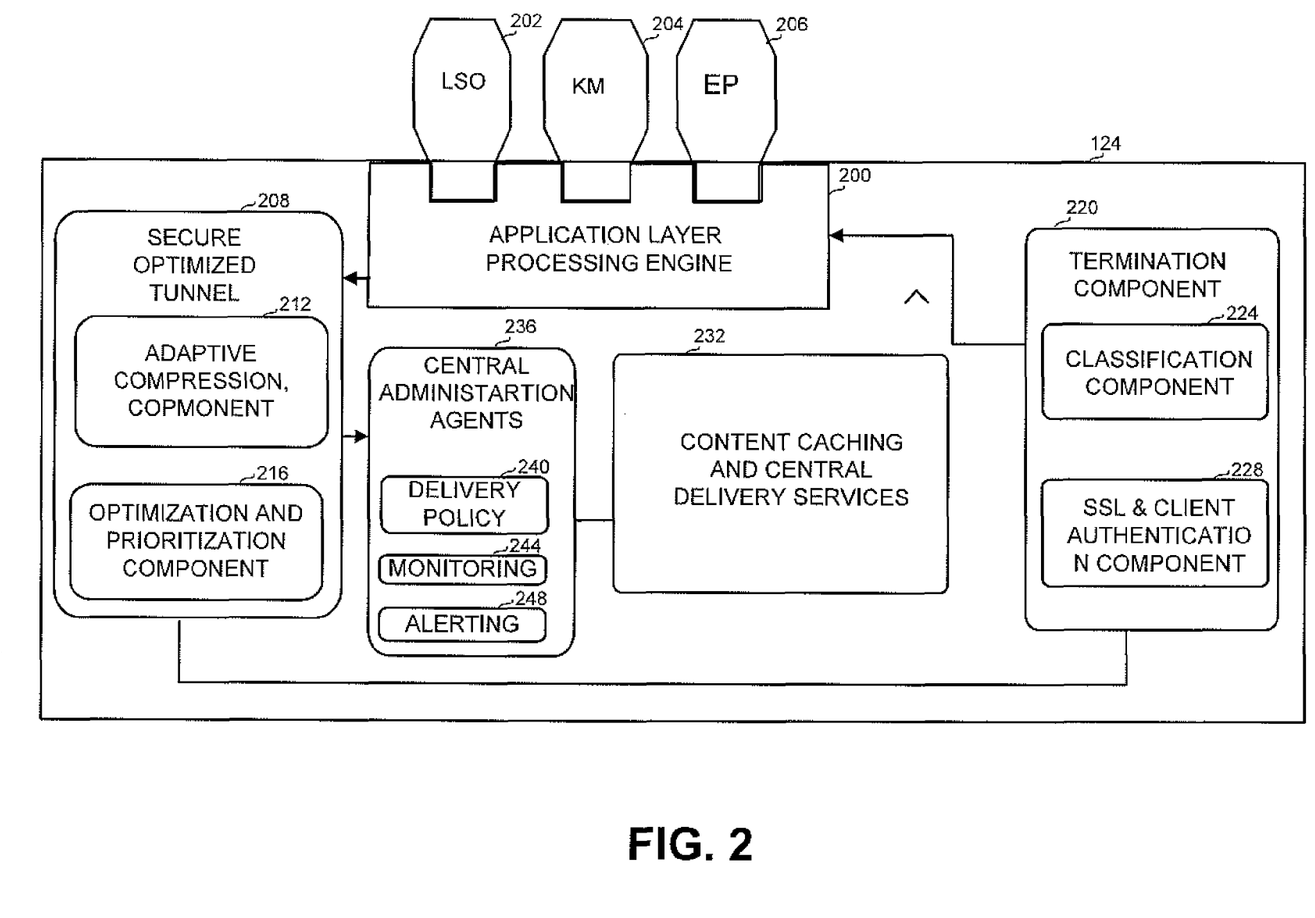
FIG. 2 is a schematic illustration of a regional office for receiving and tagging messages, in accordance with preferred embodiments of the disclosure.

Referring now to FIG. 2, showing a schematic block diagram of client front end (CFE) 124 of FIG. 1. CFE engine 124 is preferably implemented as one or more interrelated collections of computer instructions executed by a computing platform constituting a termination point for the distributed landscape. CFE engine 124 comprises a termination component 220, which is the component that first receives the user's request to perform an activity related to an executed application.

Termination component is a module optionally executed by the user's computing platform, if the platform comprises an agent or another component of the distributed system. Otherwise, the termination component is a part of CFE engine 124. Termination component 220 comprises a classification component 224 for assigning tags and thus classifying messages generated as part of an application used by a user through platforms 128, 132 or any other platform whose termination point is CFE Engine 124. Classification component 224 assigns tags to each message according to the particular characteristics of the message and the context, for example the service type, the user, and others, in accordance with a system-wide policy. Termination component 220 further comprises SSL and client authentication component 228 or any another security-related component for secure transfer of the tagged messages between CFE 124 and the user.

CFE engine 124 further comprises application layer processing engine 200 for producing particular processing instructions associated with any of the messages, according to their service type, such as Learning Solution (LSO) application type 202, Knowledge Management (KM) application type 204, or Enterprise Portal (EP) application type 206. Each platform in the environment comprises an application layer processing engine, for creating transactional objects according to the tags assigned to each message. The engines vary in the processing they supply. For some processing the engines in the data center and in the regional office complement each other, while other processing, such as load balancing between servers, is performed by only one engine.

Thus, application layer processing engine 200 performs translation of a particular classification to processing instructions, based on intimate knowledge of the relevant application. The processing instructions preferably comprise a sequence of processing through which the message will undergo. In some embodiments, application layer processing engine 200 can be generalized to also performing one or more of the particular processing associated with one or more transaction types, thus supplying distributed application service. For example, a particular application can be used for privilege-based caching, so that when a user requests a document, the engine first determined if the user's privileges are enough for receiving the document. If they are enough, and the document was earlier cached, the document is returned, otherwise a negative response is returned.

It will be appreciated that LSO, KM and EP are specific exemplary applications associated with an exemplary usage of the disclosed systems and method and are not intended to limit the disclosure.

CFE engine 124 further comprises content caching and delivery (CDN) services engine 232, for caching and delivering the messages, optionally also according to the tags of each message. For example, caching options may depend on the particular user and his or her role, so different caching options will be used according to the global policy. Caching and delivery services 232 utilize central administration agents 236 which provide information related to the global policy. Central administration agents 236 optionally comprise delivery policy agent 240 for extracting delivery policy parameters, monitoring agent 244 for extracting monitoring parameters, and alerting agent 248 for extracting alert-related parameters. All parameters are extracted from the global policy of the system, according to the particular tags associated with each message, as assigned by classification component 224. Central administration agents 236 can be managed and manipulated using administration service component 310.

CFE engine 124 further comprises secure optimization tunnel 208 for transferring tagged messages within the computerized landscape, for example to a data center. The term tunnel generally refers to a communication component enabling communication in one scheme, wherein the communicated messages encapsulate another communication scheme. For example, in the context of the disclosure, the main communication channel is TCP with optional SSL, and the encapsulated scheme is the proprietary tag-based routing scheme, encapsulated within the TCP packets.

Secure optimization tunnel 208 comprises adaptive compression component 212 for compressing the messages according to the assigned tags, and tunnel optimization and prioritization component 216 for optimizing and prioritizing the message transferring.

Figure 3:
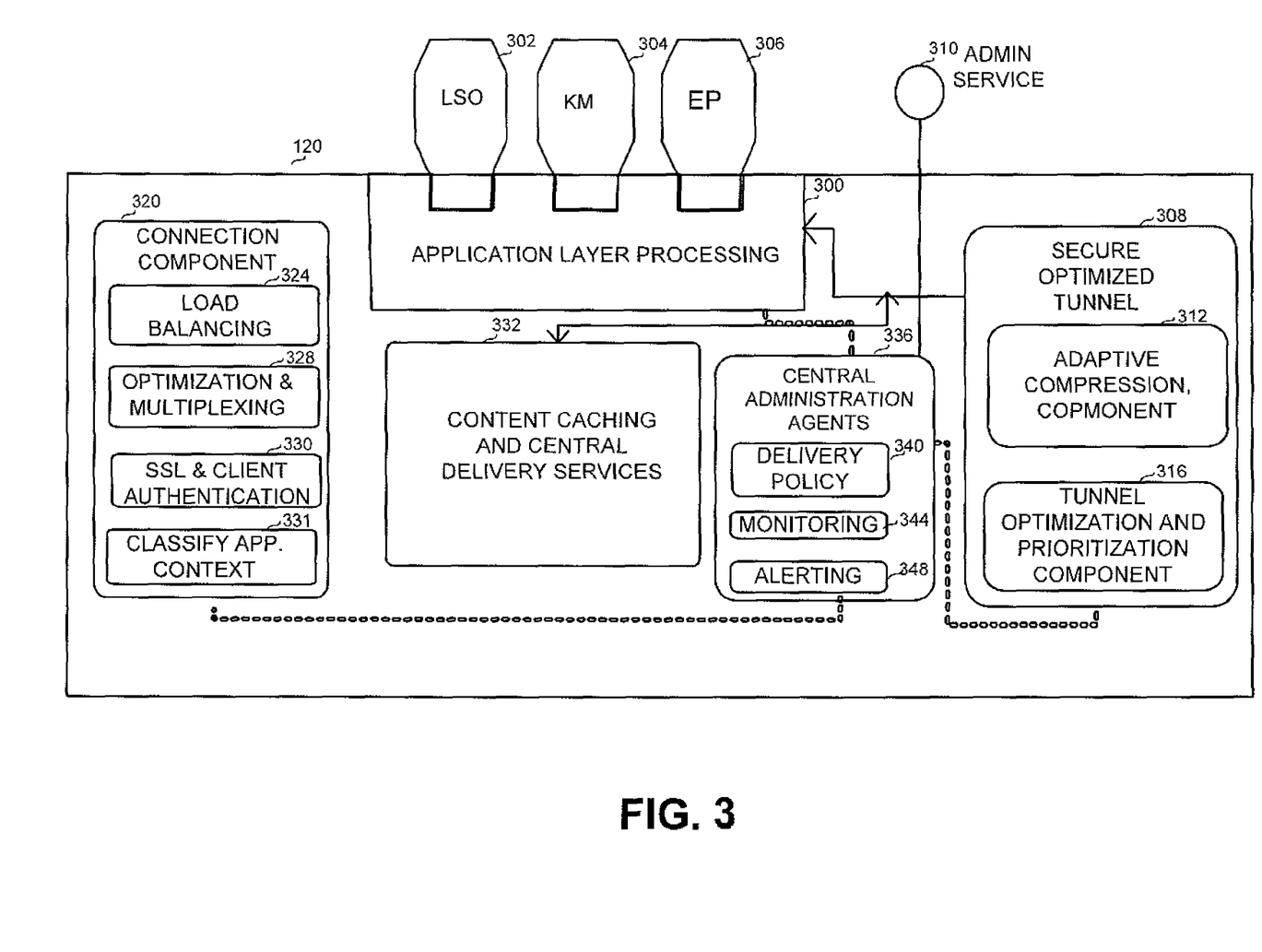
FIG. 3 is a schematic illustration of a data center for handling tagged messages, in accordance with preferred embodiments of the disclosure.

Referring now to FIG. 3, showing a schematic block diagram of server front end (SFE) 120 of FIG. 1. SFE engine 120 is preferably also implemented as one or more interrelated collections of computer instructions executed by a computing platform, such as one or more data centers. SFE engine 120, implemented as part of data center 100 comprises a connection component 320, for connecting through WAN 102 of FIG. 1 with other units of the computerized landscape. Connection component 320 comprises a load balancing component 324 for balancing the transfer and processing operations between various channels and various data centers within the landscape, optimization and multiplexing component 328 for optimizing and multiplexing messages, and in particular large buffers.

SSL and client authentication component 330 or any another security-related component for secure transfer of the tagged messages, and classification component 331 for extending classifications related to responses message for the request messages. SFE engine 120 further comprises application layer processing engine 300 similar to application layer processing engine 200 of CFE 124, for producing particular processing instructions associated with any of the messages, according to their service type, such as Learning Solution (LSO) application type 302, Knowledge Management (KM) application type 304, or Enterprise Portal (EP) application type 306. The engines are intended for creating a transactional object according to the tags assigned to a particular message. Thus, application layer processing engine 300 performs translation of a particular classification to processing instructions, based on intimate knowledge of the application to which the message relates. The processing instructions preferably comprise a sequence of processing through which the message will undergo. In some embodiments, application layer processing engine 300 can also be extended to perform one or more of the particular processing associated with one or more transaction types, thus supplying distributed application service. It will be appreciated that LSO, KM and EP are specific exemplary applications associated with an exemplary implementation of the disclosed systems and method and are not intended to limit the disclosure. One application, SFE engine 120 further comprises content caching and central delivery services engine 332, for caching and delivering the messages within the landscape, optionally also according to the tags of each message. Caching and delivery services 332 utilize central administration agents 336 which provide information related to the global policy. Central administration agents 336 optionally comprise delivery policy agent 340 for extracting delivery policy parameters, monitoring agent 344 for extracting monitoring parameters, and alerting agent 348 for extracting alert-related parameters. All parameters are extracted from the global policy of the system, according to the particular tags associated with each message, as received from a termination point.

SFE engine 120 further comprises secure optimization tunnel 308 for transferring messages to other destinations, for example to other data centers or back to a regional office. Secure optimization tunnel 308 comprises adaptive compression component 312 for compressing the messages according to the assigned tags, and tunnel optimization and prioritization component 316 for optimizing and prioritizing various message transferring.

The combination of SFE engine 120 and CFE engine 124, operating according to a uniform tagging policy enable efficient end-to-end handling of messages within a distributed landscape. At each point within the landscape the relevant processing and parameters for the message are efficiently extracted from delivery policy agents 240 of FIG. 2 or 340 of FIG. 3 according to the tags assigned to the message, so that uniform handling is provided.

Figure 4:
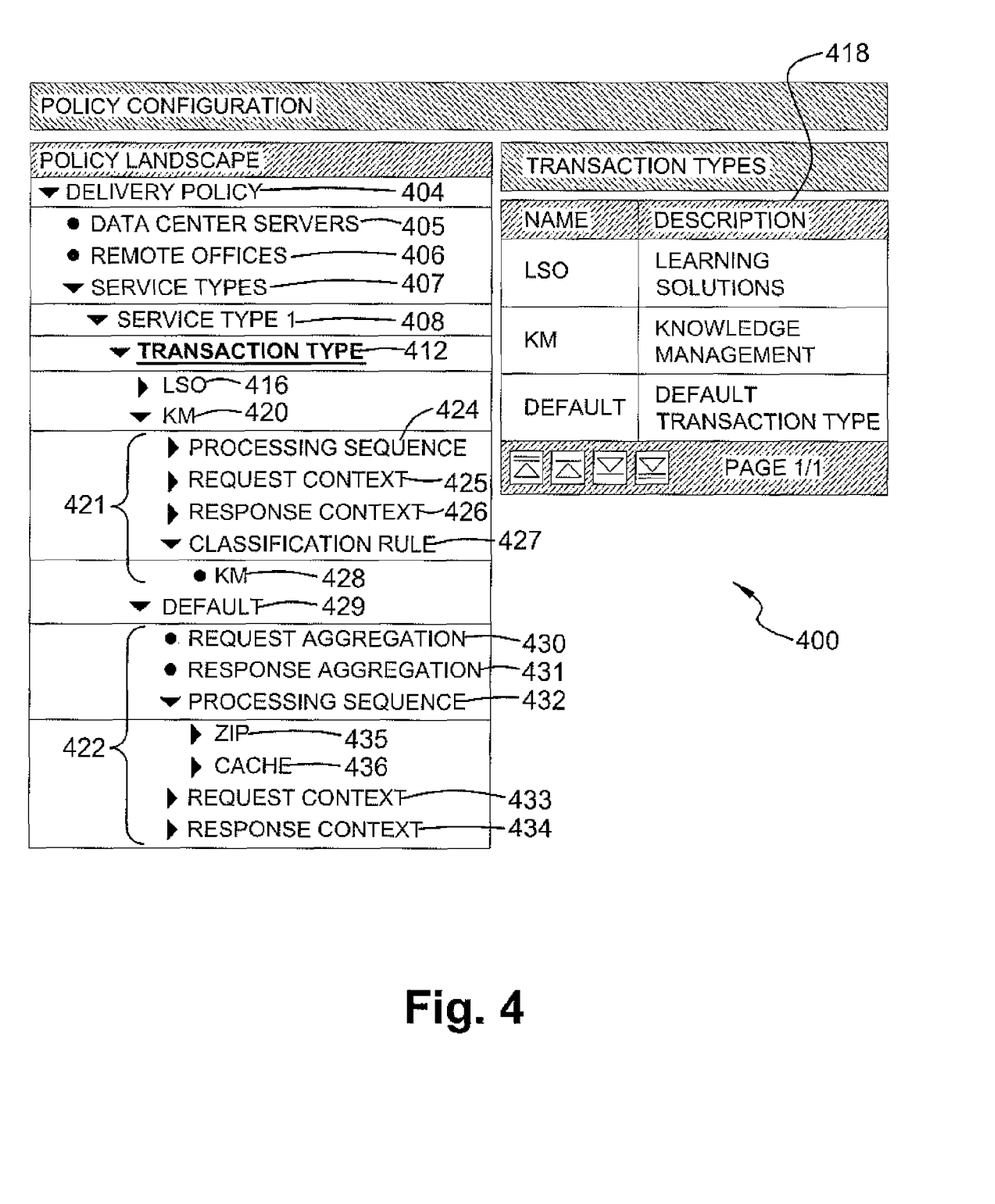
FIG. 4 is a screen shot illustration of a user interface for editing available transaction types, in accordance with the disclosure.
Figure 5:
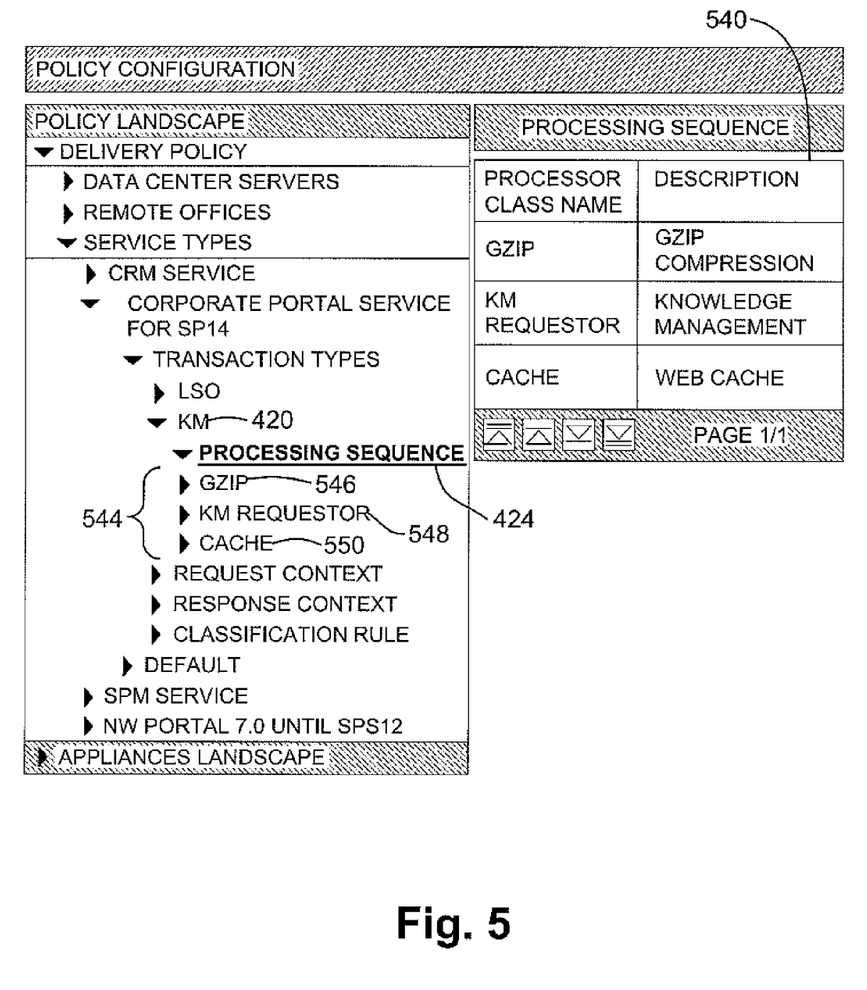
FIG. 5 is a screen shot illustration of a user interface for editing the processing sequence for messages associated with a particular transaction type in accordance with the disclosure.
Figure 6:
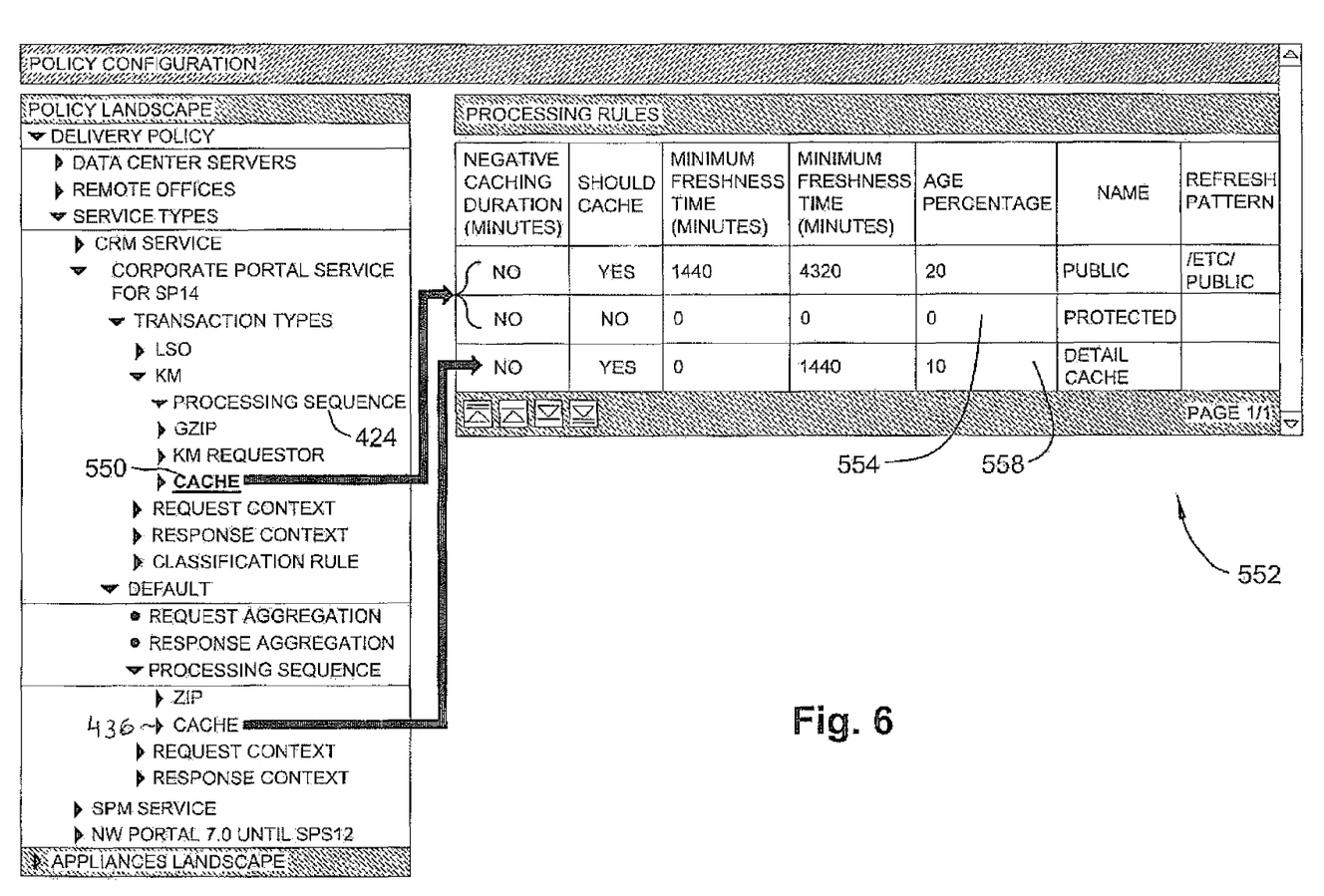
FIG. 6 is a screen shot illustration of a user interface for editing a particular processing within the processing sequence for messages associated with a particular transaction type, in accordance with the disclosure.

Referring now to FIGS. 4, 5, and 6, showing exemplary embodiments of a user interface for defining tags to be associated with transactions. Referring now to FIG. 4, showing a screen shot illustration of a user interface for editing the available transaction types. The left-hand side of the user interface comprises a hierarchical structure of processing instructions associated with various entities, while the right-hand side enables editing the selected level in the hierarchy. Thus, the exemplary displayed user interface, generally referenced 400, comprises delivery policy 404 relating to the whole organization. Delivery policy 404 comprises entries for data center servers 405, regional offices 406, and service types 407. Within service types 407, service_type_1 408 comprises transaction types 412, which comprises multiple transaction types, being LSO 416, transaction type KM 420 detailed in items 421 and a default transaction type 429 detailed in items 422. It will be appreciated that LSO and KM applications are specific exemplary applications and that any transaction-based application can be detailed. KM application 420 comprises a processing sequence transaction set 424, which relates to application level processing, and is expanded to processing instructions as detailed below; request context transaction set 425 and response context transaction set 426 which preferably relate to the configuration of the applied compression engine; and classification rule transaction set 427, which comprises classification rules such as a KM classification rule 428, which provide the rules for classifying a message at the termination point. Default transaction type 429 comprises a request aggregation transaction set 430, a response aggregation transaction set 431, and a processing sequence transaction set 432, which further comprises a zip item 435 and a cache item 436. Default transaction type 429 further comprises request context transaction set 433 and response context transaction set 434. The right hand side of the user interface, comprising list 418, shows all items under the currently selected item of the left hand side, being transaction types 412.

Referring now to FIG. 5, showing a screen shot illustration of a user interface for editing the processing sequence for messages associated with a particular transaction type. On the left hand side of the screen, processing sequence 424 associated with a KM transaction type 420 is selected. The current processing sequence is shown as gzip item 546, KM_requestor item 548 and cache item 550. Window 540 on the right hand side shows the items and enables the addition, deletion or updates of items.

Referring now to FIG. 6, showing a screen shot illustration of a user interface for editing a particular processing within the processing sequence for messages associated with a particular transaction type. In FIG. 6, cache item 550 is selected from the items under processing sequence 424, and table 553 on the right hand side of the screen shows the caching rules. The rules comprise rules 554 which are specific to the caching within KM transactions, and rule 558 which is derived from the rules associated with default caching 436. Each rule comprises conditions to be met for the rule to be applied, and parameters or configurations to be used when processing takes place.

It will be appreciated that when a KM message is to be tagged, the rules are preferably tested in the order they appear, and the first rule for which the conditions are met, is the one to be executed, i.e. processing is to be performed according to the parameters and configurations thereof.

It would be appreciated that FIGS. 4, 5 and 6 show only parts of the hierarchy, for example the rules relating to data center services 405, KSO transaction type 416, request context transaction set 425, or other entities are not displayed on FIG. 4 although they may exist in the shown exemplary system. It will be further appreciated that selecting any item in the hierarchy on the left hand side of FIG. 4, 5 or 6 will present on the right hand side the properties, options, or sub-items relevant to the selected item.

In some embodiments, each transaction type, such as KM 412 or LSO 416, is initially assigned all items of the default transaction type, which can be overridden if the designer wishes. Thus, in the displayed example, KM transaction type comprises request aggregation transaction set 430 and response aggregation transaction set 431 of default transaction type 429. If specific request aggregation transaction set or specific response aggregation transaction set are defined, the defaults will not come into effect. Alternatively, the defaults may be added to a list of items associated with the specific set. When only one out of a number of rules is to be applied, the rule to be applied may be the first rule whose conditions are met, an arbitrary rule or any other method of selecting one of the available rules.

It will be appreciated that the tags can be implemented as data structures, such as objects. If efficient real time processing is required, the tags can be implemented as a collection of integers arranged as Tag Type and Tag value sections. Such implementation enables efficient in memory resolving. Configuring the processing which relates to the delivered service type is consolidated in the Service Type repository 116 of FIG. 1. For configuring application processing layer 200 of FIG. 2 or 300 of FIG. 3, a tag set of sub service (also termed Transaction Type) may be resolved to obtain a collection of transaction sets, wherein each transaction set comprises or is linked to one or more sequences.

It will be further appreciated that by default, a response processing sequence is optionally automatically generated according to the corresponding request sequence and parameters thereof so no additional work is required.

Figure 7:
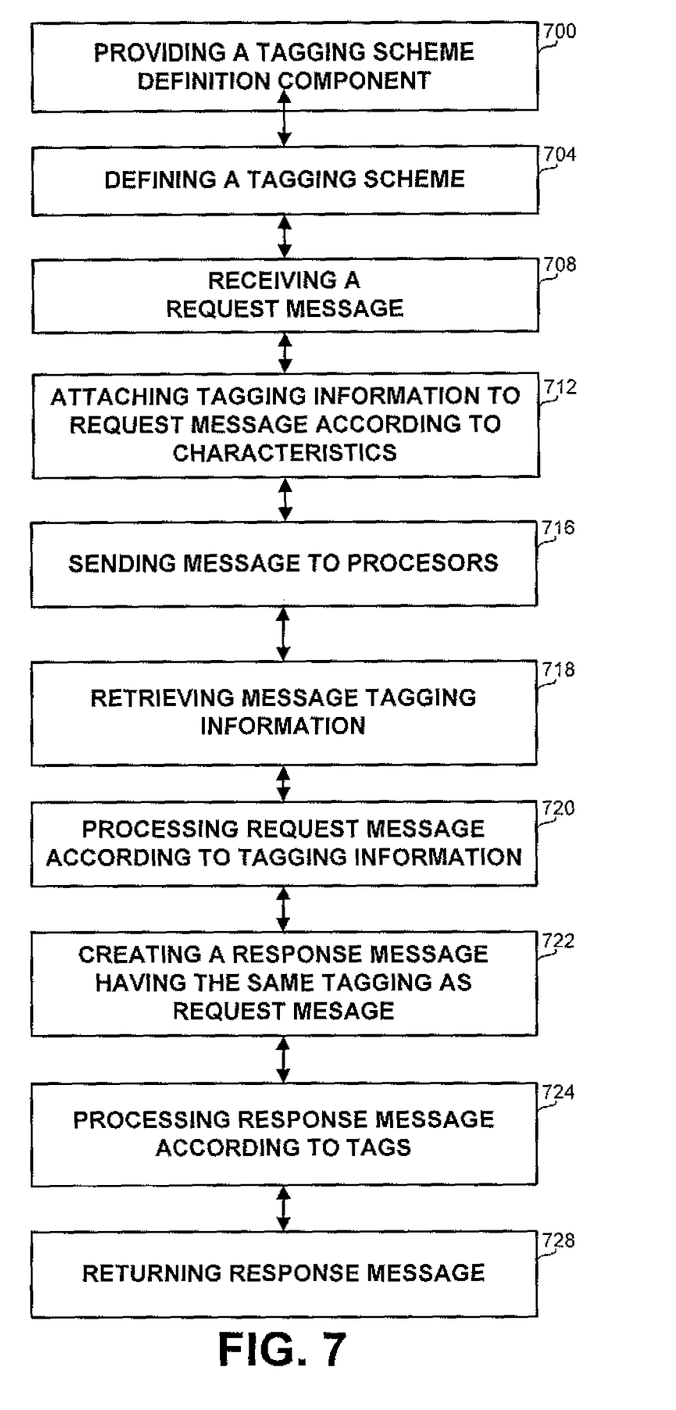
FIG. 7 is a block diagram of the main steps in a method according to the disclosure.

Referring now to FIG. 7, showing a flowchart of the main steps in the method of the disclosure.

On step 700, a tagging scheme definition component is provided to a user. The definition component comprises a user interface part, which may be similar in functionality or appearance to the user interface shown and detailed in association with FIG. 4, 5 or 6 above, and an engine which constructs a tagging hierarchy for transactions within the environment.

On step 704, a tagging scheme is received, the tagging scheme being defined using the tagging scheme definition component provided on step 700. The tagging scheme can be defined by an administrator of the system, or by another person having knowledge about the various applications and transaction types in the system, and which processing id required for any of them.

On step 708, the system is operative and a request message is sent front an application and received at a termination point. The termination point can be the same computing platform the user is working with, or a server connected to the computing platform.

On step 712 the request message is tagged, i.e. tags are attached to the message according to various parameters, such as the application the message relates to, the service type, the user, the regional office, the data center, user privileges, required quality of service and others. Tagging includes the required processing instructions for the message and relevant parameters for each processing. The processing instructions are optionally consolidated into a service type data structure which may include transaction type data structures.

On step 716 the tagged message is sent to one or more processors, on step 720 each of the processors retrieves the relevant configuration and parameters from the tags, and on step 720 the processor processed the message according to the retrieved parameters and configuration. On optional step 722 a response message is created which corresponds to the request message. By default, the same tagging information attached to the request message is also attached to the response message, so that the response undergoes the same processing, for example compression, encryption, and caching, by the same processors. Processing may include any adaptive compression, tunneling, routing, caching, optimization manipulation, functionality optimization, or other processing.

On optional step 724 the response message, if created, is processed according to its tags, whether the tags were assigned by default according to the tags of the request, or by any other manner. On optional step 528 the response message, if created, is returned to the user via the termination point.

The disclosed method and apparatus enable the automatic uniform processing of messages throughout a distributed system, according to a single system-wide policy. Tags are attached to a message according to its characteristics, so that uniform processing is ensured for the messages throughout the system. For some request messages, corresponding response messages are constructed and processed accordingly to further ensure uniform processing.

The disclosed system and method are optionally enabled as part of the termination layer, also referred to as user layer or "Layer 8". Layer 8 is considered to be a layer beyond the applicative layer in the OSI seven layer model.

Optionally, for each set of related transaction types, an application proxy may be provided which comprises the related request and response processors. Such proxy may be provided as a shared object to further ensure compatibility within the distributed system. In preferred embodiments of the disclosure, the tags set may be used to determine a context of resources to be used in adaptive compression components 212 of FIG. 2 or 312 of FIG. 3, in controlling prioritization in optimization and prioritization components 216 of FIG. 2 or 316 of FIG. 3, in security related application proxies, or the like.

It will be appreciated by a person skilled in the art that multiple variations and options can be designed along the guidelines of the disclosed method, without deviating from the guidelines of the disclosure. Such variations and options are considered to be covered by the disclosure.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation, material, step of component to the teachings without departing from the essential scope thereof. Therefore, it is intended that the disclosed subject matter not be limited to the particular embodiment disclosed as the best mode contemplated for carrying out this invention, but only by the claims that follow.

The invention claimed is:

1. In a distributed computer network, a method for providing a service from an application according to a predetermined policy, the method comprising the steps of:
   receiving a tagging scheme related to the application at a computing platform serving as a termination point for the distributed computer network; wherein the tagging information indicates which processes the message should undergo by the application and with which parameters and configurations, based on user context information or application context information;
   receiving a request message at the termination point from a user of the application to receive the service provided by the application;
   attaching tagging information to the request message according to the tagging scheme;
   sending the request message with the tagging information to a server computing platform serving as a processor of the application;
   retrieving at least one parameter or configuration value from the tagging information; and
   processing the request message with the application according to the at least one parameter or configuration value.

2. The method of claim 1 further comprising the step of providing a tagging scheme definition component for defining the tagging scheme.

3. The method of claim 1 further comprising the step of creating a response message having substantially the same tagging information as the request message.

4. The method of claim 3 further comprising the steps of:
   retrieving at least one second parameter or configuration value from the tagging information attached to the response message; and
   processing the response message according to the at least one second parameter or configuration value.

5. The method of claim 1 wherein the tagging scheme relates to a transaction type to which the application belongs.

6. The method of claim 1 wherein the tagging scheme relates to a parameter or a configuration value of at least one item selected from the group consisting of: compression; decompression; encryption; decryption; tunneling; security; monitoring; routing; optimization; and quality of service.

7. The method of claim 1 wherein the tagging scheme relates to at least one item selected from the group consisting of: a service type; a sub-service type; the application; a transaction type associated with the application; a user of the application; a role of the user; a location of the user; a regional office used by the user; a data center associated with the user or with the application; and context of the application.

8. The method of claim 1 wherein the predetermined policy is an organization-wide policy.

9. An apparatus for providing a service in a distributed computer network according to a uniform policy, the apparatus comprising:
   a first computing platform for executing a client front end, including a general purpose computer with a processor and storage device for receiving a request message from a user to receive a service from an application, the client front end comprising:
      a termination point for receiving the request message from the user of the application;
      a classification component for attaching tagging information to the request message according to the uniform policy, so that the tagging information will be delivered with the request message; wherein the tagging information indicates which processes the message should undergo by the application and with which parameters and configurations, based on user context information or application context information; and
      an application layer processing engine for producing processing instructions associated with the request messages, based on the tagging information.

10. The apparatus of claim 9 further comprising a second computing platform for processing the request message, the second computing platform executing a server front end, the server front end comprising an application layer processing engine for producing processing instructions associated with the request message, based on the tagging information attached to the request message, and preparing a response message having substantially the same tagging information as the request message.

11. The apparatus of claim 9 wherein the client front end further comprises:
   a content caching and delivery services engine for caching and delivering the request message or the response message according to the tagging information of the request message; and
   a tunnel for transferring the request message or the response message with the tagging information within the distributed computer network.

12. The apparatus of claim 11 wherein the tunnel executed by the first computing platform comprises a compression component for compressing the request message or the response message according to the tagging information, or an optimization and prioritization component for optimizing and prioritizing message transferring.

13. The apparatus of claim 10 wherein the server front end further comprises:
   a content caching and delivery services engine for caching and delivering the request message or a response message according to the tagging information of the request message;

a tunnel for transferring the request message or the response message with the tagging information within the distributed computer network;

a connection component for connecting the termination point and the second computing platform; and a classification component for assigning tagging information to a response message associated with the request message, according to uniform policy.

14. The apparatus of claim 13 wherein the tunnel executed by the second computing platform comprises a compression component for compressing the request message or the response message according to the tagging information, or an optimization and prioritization component for optimizing and prioritizing message transferring.

15. The apparatus of claim 9 wherein the tagging scheme relates to a transaction type to which the application belongs.

16. The apparatus of claim 9 wherein the tagging scheme relates to a parameter or a configuration value of at least one item selected from the group consisting of: compression; decompression; encryption; decryption; tunneling; security; monitoring; routing; optimization; and quality of service.

17. The apparatus of claim 9 wherein the tagging scheme relates to an at least one item selected from the group consisting of: a service type; a sub-service type; the application; a transaction type associated with the application; a user of the application; a role of the user; a location of the user; a regional office used by the user; a data center associated with the user or with the application; and context of the application.

18. The apparatus of claim 13 wherein the connection component comprises a load balancing component for balancing message transfer and processing operations between computing platforms within the distributed computer network, or an optimization and multiplexing component.

19. The apparatus of claim 9 further comprising a tagging scheme definition component for defining the uniform policy.

20. The apparatus of claim 9 further comprising an administration agents component for extracting processing information from the tagging information.

21. The apparatus of claim 9 wherein the administration agents component comprises a delivery policy agent for extracting delivery policy parameters, a monitoring agent for extracting monitoring parameters; or an alert agent for extracting alert-related parameters.

22. The apparatus of claim 9 wherein the predetermined policy is an organization-wide policy.

23. A non-transitory computer readable storage medium containing a set of instructions for a general purpose computer to perform the method of claim 1.

* * * * *